R. WHITE.
VEGETABLE PICKER.
APPLICATION FILED JULY 29, 1912.
1,072,065.
Patented Sept. 2, 1913.
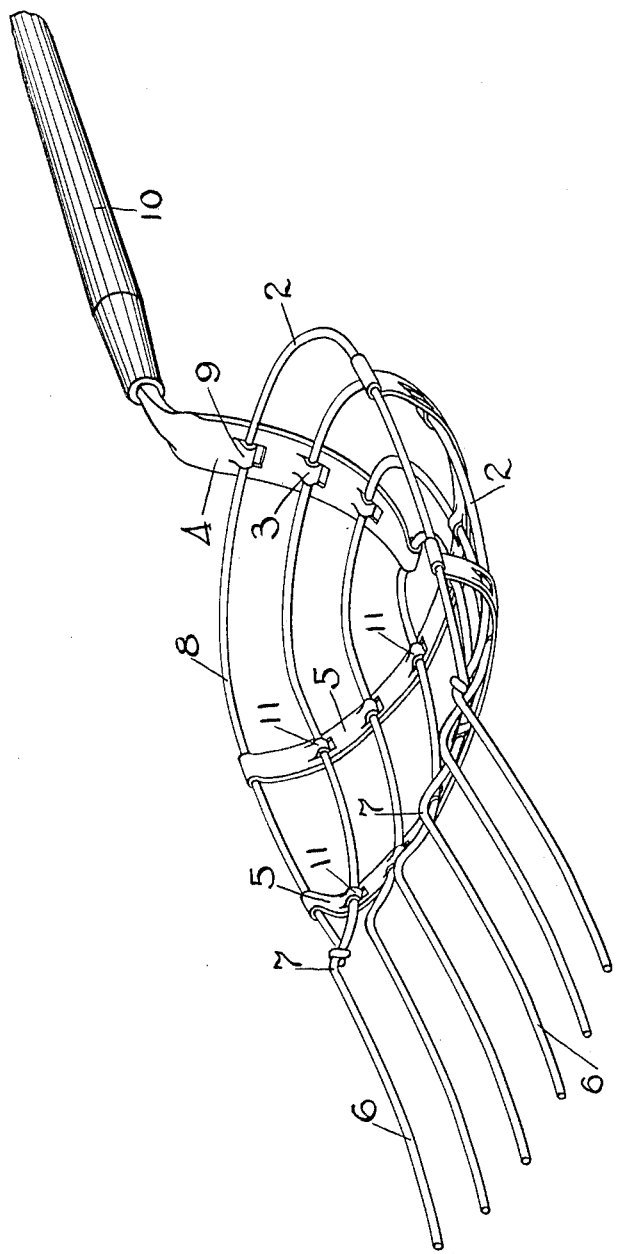
WITNESSES.
Walter D. MacNutt
A. Swanson.
INVENTOR
Robert White
By Lothrop Johnson
his Attorneys

UNITED STATES PATENT OFFICE.

ROBERT WHITE, OF ST. PAUL, MINNESOTA.

VEGETABLE-PICKER.

1,072,065.          Specification of Letters Patent.          Patented Sept. 2, 1913.

Application filed July 29, 1912. Serial No. 712,044.

*To all whom it may concern:*

Be it known that I, ROBERT WHITE, a citizen of the United States, residing at St. Paul, in the county of Ramsey and State of Minnesota, have invented certain new and useful Improvements in Vegetable-Pickers, of which the following is a specification.

My invention relates to improvements in vegetable pickers, its object being to provide an improved tool for picking up and holding potatoes and other root vegetables and freeing them from dirt.

To this end the invention consists in the features of construction and combination and arrangement of parts hereinafter described and claimed.

In the accompanying drawing forming part of this specification is shown a perspective view of the improved tool.

As shown in the drawings the picker is formed of a series of spaced U-shaped longitudinal members 2, made preferably of bent wire, and secured at the bight in clips 3 bent or struck up from the downwardly and forwardly extending medial rib or shank 4. They are supported at their sides upon downwardly curved cross stays 5 by means of clips 11 struck up from said stays. The wires 2 extend beyond the stays to form tines 6 which are bent up to form shoulders 7 just forwardly of the front cross stay. The cross stays are secured at their free ends to the sides of a U-shaped top member 8, made preferably of wire, and secured at its rear to the shank 4 by means of a clip 9. The ends of the wire 8 are secured to the outside longitudinal wires 2 forwardly of the front cross stay. To the shank 4 is secured a handle 10. Thus the wire members 2 are bent to form a basket at the inner end of the picker, so that the potatoes, as they are picked up by the tines 6, will drop over the shoulders 7 into the basket portion at the rear end of the picker.

By the coöperation of the features described I secure an implement which is particularly effective in picking the potatoes and retaining them in the basket portion of the picker, and at the same time thoroughly freeing them from dirt. The implement is simple and strong in construction, and easy to make and to keep in repair.

I claim as my invention:

1. A vegetable picker comprising a shank, a scoop portion formed of spaced wires bent to form an inner basket, and forwardly extending tines with upwardly projecting shoulders adjacent to the basket, said shank being formed with clips supporting the wires at the rear of said basket.

2. A vegetable picker comprising a scoop portion formed of spaced wires doubled upon themselves to form an inner basket, tines extending forwardly from said basket, cross stays connecting and interlocking with the side portions of said wires, and a shank supporting the rear of said basket and holding the wires thereof in spaced relation.

In testimony whereof I affix my signature in presence of two witnesses.

ROBERT WHITE.

Witnesses:
H. SWANSON,
ARTHUR P. LOTHROP.